United States Patent [19]

Yoshikawa et al.

[11] 3,927,156
[45] Dec. 16, 1975

[54] PRODUCTION OF INK-FEEDING AND WRITING CORE FOR WRITING INSTRUMENT

[75] Inventors: Shinsuke Yoshikawa; Hiroyuki Endo; Shuji Terasaki, all of Iwaki, Japan

[73] Assignee: Kureha Kagaku Kogyo Kabushiki Kaisha, Nihonba, Japan

[22] Filed: Feb. 15, 1973

[21] Appl. No.: 332,757

Related U.S. Application Data

[63] Continuation-in-part of Ser. No. 75,327, Sept. 25, 1970, abandoned.

[30] Foreign Application Priority Data

| Sept. 30, 1969 | Japan | 44-77385 |
| Oct. 8, 1969 | Japan | 44-79954 |
| Oct. 8, 1969 | Japan | 44-79955 |
| May 22, 1970 | Japan | 45-43262 |

[52] U.S. Cl. ................................. 264/15; 264/126
[51] Int. Cl.² ........................................... B29C 1/14
[58] Field of Search ....... 264/126, 15, DIG. 51, 109

[56] References Cited

UNITED STATES PATENTS

| 2,976,574 | 3/1961 | Keutgen et al. | 264/15 |
| 3,259,677 | 7/1966 | Zwick | 264/126 |
| 3,642,970 | 2/1972 | Hagitani et al. | 264/126 |

*Primary Examiner*—Robert F. White
*Assistant Examiner*—J. R. Hall
*Attorney, Agent, or Firm*—Wenderoth, Lind & Ponack

[57] ABSTRACT

Method for producing a writing core having a porosity in the range of from 30 to 60%, which core is made from polyvinylidene fluoride powder having a bulk density of 0.5 to 1.0 g/ml and a uniform particle size range of 10 to 300 microns, produced by filling a mold with the powder, heating the powder to a temperature of from the melting point thereof to 350°C in a pressure-free state and heat-treating the formed core taken out of the mold at a temperature of from 70°C to a temperature lower than the melting point thereof for more than 3 hours.

2 Claims, 9 Drawing Figures

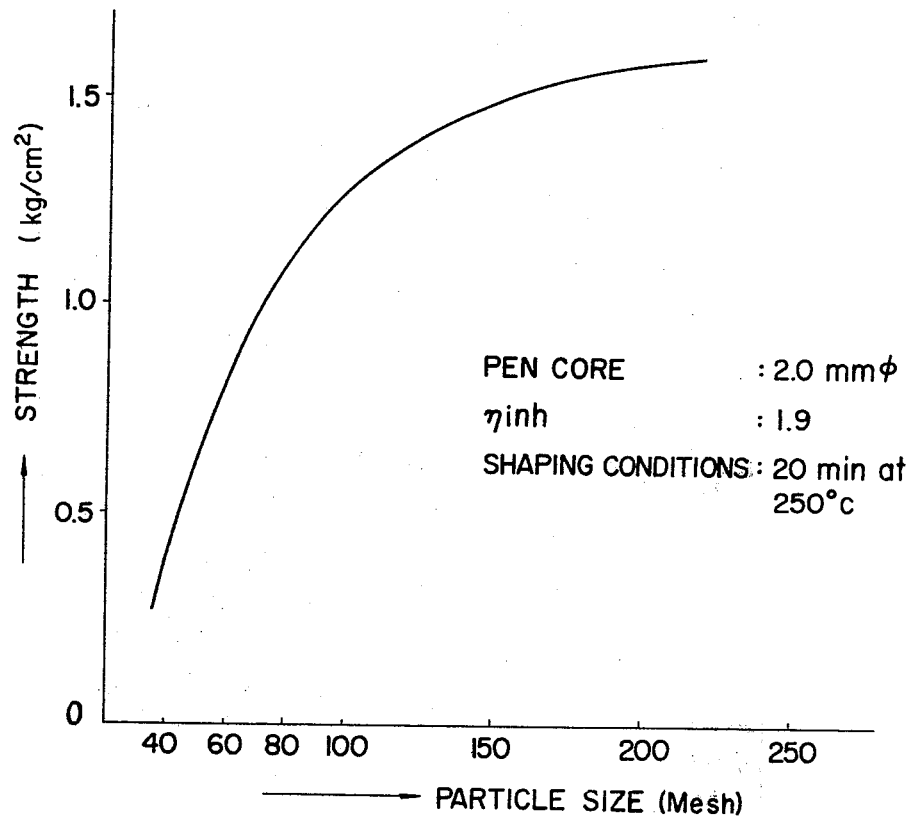

PRODUCTION OF INK-FEEDING AND WRITING CORE FOR WRITING INSTRUMENT

This is a continuation of U.S. Pat. application, Ser. No. 75,327, filed Sept. 25, 1970, now abandoned.

BACKGROUND OF THE INVENTION

This invention relates to a method for producing an ink-feeding and writing core (or pen core) for a writing instrument such as a felt pen or the like from a thermoplastic resin powder. More particularly, the present invention is concerned with the production of an ink-feeding and writing core (or pen core) from polyvinylidene fluoride (PVDF) having high hardness and wear-resistant properties which writing core is free of clogging due to the deformation of the constituent polymer particles, and is therefore capable of a good ink flow and yet has sufficient hardness to be used in repeated writings.

The general requirements for an ink-feeding and writing core for a writing instrument are that it provide a constant flow of ink in a quantity sufficient to write smoothly, and possess at the tip thereof, hardness, wear-resistance, and strength sufficient to withstand pressure during writing. In this sense, a PVDF resin is characteristically excellent in its handness, wear-resistant, chemical-resistant and oil-resistant properties, hence it is eminently suited as an ink-feeding core for any kind of ink.

SUMMARY OF THE INVENTION

It is therefore an object of the present invention to provide a method for producing a pen core from a PVDF powder, wherein a resin powder having a bulk density of 0.5 to 1.0 gr/ml and an inherent viscosity of 0.8 and above is heat-treated in a metal mold at a temperature above the melting point of PVDF, i.e. 350°C.

It is another object of the present invention to provide a method for producing a pen core having a porous structure containing a uniform distribution of voids therein, which is attained by heat-treating the PVDF powder material within the metal mold under atmospheric pressure.

It is still another object of the present invention to provide a method for producing a pen core of high mechanical strength by further heat-treating the porous pen core after it is taken out of the metal mold at a temperature of from 70°C to a temperature below the melting point of the material over 3 hours.

It is another object of the present invention to provide a pen core having a porosity of 30 to 60% by using as the raw material for the pen core, a spherical powder of PVDF having a large bulk density and a particle size of from 300 to 10 microns which is obtained from the preliminary heat-shrinkage of a PVDF powder of small bulk density produced from the suspension-polymerization technique.

The foregoing objects, and other objects of the present invention, will become more apparent from the following detailed description when read in conjunction with the accompanying drawings, in which:

FIGS. 1a and 1b are graphical representations, respectively showing the pen core of the conventional type and that of the PVDF according to the present invention;

FIGS. 2a and 2b respectively indicate the enlarged tip portion of the pen core shown in FIGS. 1a and 1b;

FIG. 6 is a graphical representation showing the relationship between the strength of the pen core and particle size of the PVDF material, when the core is shaped from PVDF powder having a large apparent specific gravity.

DETAILED DESCRIPTION OF THE INVENTION

Figure 1:
Figure 1:

The PCDF resin to be used in the present invention is in the form of powder obtained from a suspension- or emulsion-polymerization, having as uniform a particle size as possible in the range of from 10 to 300 microns, and an inherent viscosity $\eta_{inh}$ of more than 0.8 (as measured in a 4 g/l solution of N,N'-dimethylformamide). Under a particle size of 10 microns, the formation of a fluidizing layer is difficult when the powder material is pre-heated. Above a particle size of 300 microns, the heat-treated pen core is weak in strength. Even with a PVDF powder having a large apparent specific gravity, if the particle size thereof is below 10 microns, the produced pen core is less porous, thereby reducing the flowability of ink. Also, if the inherent viscosity $\eta_{inh}$ is below 0.8, the polymer particles become fluidized at the time of firing causing remarkable deformation thereof, and the mechanical strength of the pen core becomes lower, i.e. when the material is shaped into a uniformly porous texture to provide a good flow of ink, it becomes brittle. The polymer having an inherent viscosity of 1.0 to 4.0 is usually used, but there is no stringent upper limit thereto. For example, the inherent viscosity of more than 5.0 may produce a shaped product of good quality.

In general, it is possible to obtain a porous shaped article of any desired porosity by the appropriate selection of particle size, preheating temperature, and powder forming pressure of the polyvinylidene fluoride. The preferable range of porosity is from 30 to 60%, of which a range of 35 to 45% is the optimum from the standpoint of permeability and ink flow as well as mechanical strength of the pen core. Above a porosity of 60%, the strength of the core is weak and the rates of permeation and flow of ink are low, while below a porosity of 30%, the permeation of the ink is poor.

The melting point of PVDF depends upon the polymerization conditions. It is usually within the range of from 160 to 190°C. Since the pen core is required to have sufficient hardness, it is desirable to use a resin material obtained from polymerization at a relatively low temperature, and having a melting point of 175°C and above, an inherent viscosity $\eta_{inh}$ of 1.2 and above, and a high degree of crystallization.

The pen core of PVDF is produced by heat-treating (firing) the PVDF powder within a metal mold. At this firing process, the bulk density of the PVDF material constitutes an important factor. As PVDF obtained from ordinary suspension-polymerization is composed of particles having extremely large voids and the bulk density of less than 0.5 gr/ml, it is inevitably necessary to preheat such low bulk density material at a temperature higher than its melting point to cause it to shrink. As the melting point of PVDF is below 190°C, it is sufficient that the temperature for heat-shrinkage and heat-bonding of the material be higher than 190°C. In practice, however, the metal mold should preferably be kept at a somewhat higher temperature. When the metal mold is below 200°C at the time of shaping under heat, the effects of shaping (or molding) are inferior. Above 350°C, the range of time for heat-shaping is narrowed with the result that desired shaping becomes difficult. A preferable range of the firing temperature is from 250°C to 300°C. Although a PVDF powder having a small bulk density is subjected to preheat-treatment at a temperature range of from 200 to 300°C, a material having a large apparent specific gravity need not be treated as to high a temperature as in the case of a material having a small specific gravity. The preheating of the material having a large specific gravity may be carried out at a temperature of 70° to 170°C, which is almost the equal to the heat-treatment employed after molding the PVDF into the shape of a pen core.

The heat-treatment of the molded core is not necessarily carried out in a fluidizing bed, but is sufficiently carried out in a high temperature atmosphere. The preliminary heating, however, should be done in a fluidizing bed, although, when coarse particles result from the fusion-bonding of the powder particles, it is desirable to screen them out through a sieve so that the PVDF powder to be charged into the metal mold may be uniform in its particle size. No mechanical pressure need be imparted at the time of charging the PVDF powder material into the metal mold. Application of pressure is undesirable in this case. The reason for this is that the pen core of the present invention does not have in its texture coarse particles resulted from fusion-bonding of the fine PVDF powder, but rather is provided with smooth, uniform, and continuous pores formed by the constituent powder particles; hence, if pressure is applied all at once at the time of shaping, only the surface part of the shaped body is pressed due to the bridging phenomenon of the powder particles, which results in a non-uniform porous structure, and a pen core of desirable quality cannot be obtained.

Figure 2:
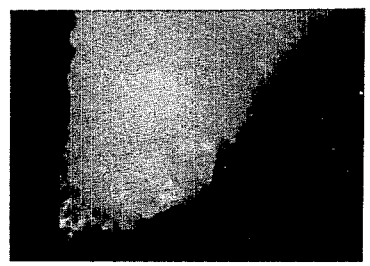
Figure 2:
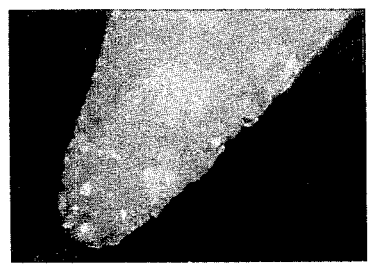
Figure 3:
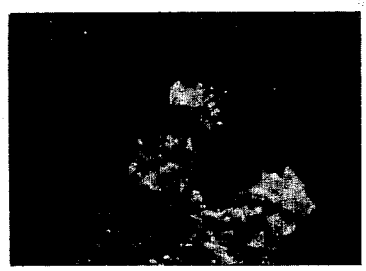
FIGS. 3a and 3b are enlarged microphotographs respectively showing the texture of the pen core in FIGS. 1a and 1b taken from a sample piece sliced from the surface part of the core tip.
Figure 3:

It is preferable that the PVDF powder used to produce the porous structure by the heat-treatment be in a spherical form of uniform size. The size of the individual spherical particles of polymers obtained by emulsion-polymerization is extremely fine being less than 1 micron. It is thus hardly possible to melt only the surface part of such fine polymer particles. Even if this is possible, the gaps formed by the bonded particles are too small to permit smooth passage of the writing liquid. Suspension-polymerization is another method of obtaining spherical polymer particles, by which pearl-like particles can be obtained. The polymer particles are ideal material for producing the pen core. However, when PVDF is to be produced by suspension-polymerization, the vinylidene fluoride monomer becomes the polymer which must substantially maintain its original outer shape, so that, in the case of the resin which has a different true specific gravity between the monomer and the polymer, there inevitably occurs voids within some of the spherical polymer particles. When the voids are relatively small in number, a product of stable form can be obtained upon firing under pressure, even if the polymer particles shrink to some extent at the time of heat shaping. Polyvinylidene fluoride having optimum hardness and chemical-resistant properties, suitable as the material for the pen core, possesses a true specific gravity of 1.75, while the monomer thereof has a true specific gravity of about 0.5 with the consequence that approximately 70% by volume of the individual spherical polymer particles is a void. The polymer particles having such large voids exhibit a notable degree of shrinkage when heat-shaped, and, even if they are compressed at the time of heat-shaping, the degree of adherence among the particles is considerably fluctuated, as a result of which when the shaped product is taken out of the metal mold, it is deformed due to strain as shown in FIG. 1a. The deformation is more remarkable when no pressure is imparted at the time of shaping. Also, when the material is compressed at the time of shaping, there is apprehension that the particles on the surface part of the shaped article, which is pressed against the high temperature metal mold, will be deformed so as to lose their smoothness and cause clogging due to fusion-bonding. FIG. 2a is an enlarged photographic representation of the tip of the pen core shown in FIG. 2a is an enlarged photographic representation of the tip of the pen core shown in FIG. 1a. FIG. 3a is an enlarged photographic representation of the texture of the tip of the pen core, which has been made by slicing the surface part of the tip. It will be seen from these figures that the polymer particles at the surface are mostly fusion-bonded by compression to such an extent that the particles no longer retain their original shape. Thus, in a pen core produced without pressure application, the fired particles at the surface part of the tip eventually deform to some extent after long hours of writing, and the gaps among the particles become narrower and narrower so as to gradually reduce the effluent quantity of the writing liquid from the tip and finally cause grazing due to the shortage of ink feeding.

The presnt inventors have discovered that, by heat-treating the pen core thus fired, cooled, and solidified and taken out of the metal mold, for a very long period of time at a temperature ranging from 70°C to the melting point of the resin material, the fired particles improve their hardness and bring about the least deformation in the particle shape. By this method, an extremely favorable pen core can be produced which does not graze or scratch due to shortage of ink feeding. FIGS. 1b, 2b, and 3b, respectively, indicate the pen core produced by the present invention, and correspond to the photographic representations in FIGS. 1a, 2a, and 3a.

Figure 4:
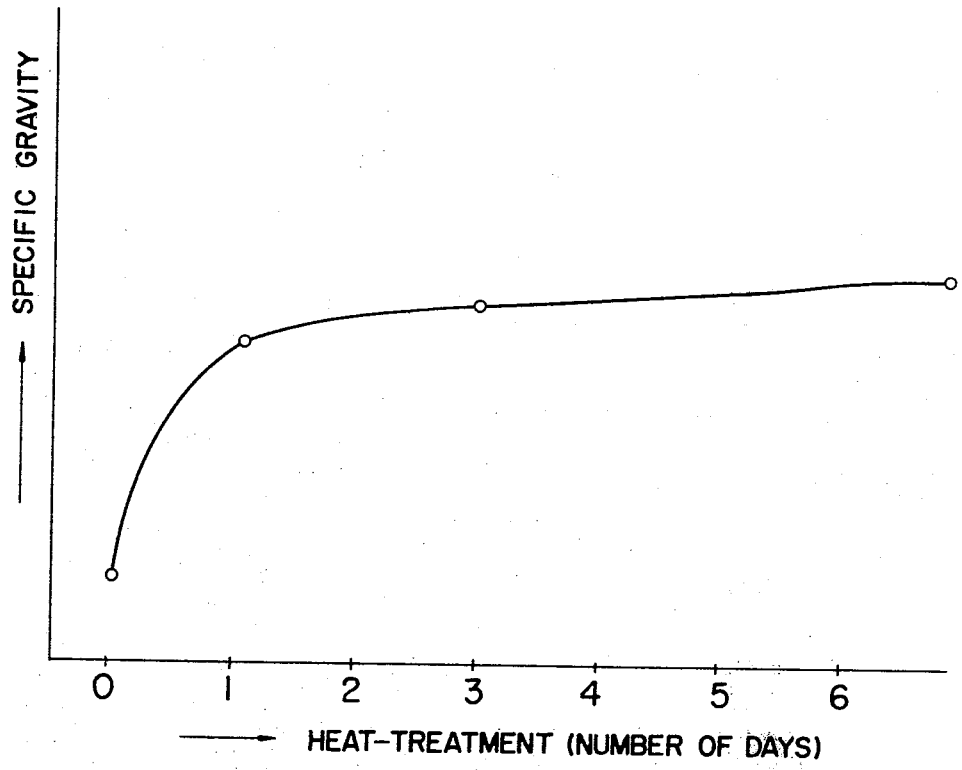
FIG. 4 is a graphical representation showing variation in the specific gravity of the PVDF article due to heat-treatment.

According to the experiments conducted by the present inventors, it has been found out that the specific gravity of PVDF right after shaping is 1.760 or so, and, when it is left at a room temperature, crystallization of the polymer proceeds at a very slight degree, although substantially no difference in its specific gravity can be recognized, even if it is left in this state for six months, or so. However, when this shaped article is heat-treated at a temperature of, for example, 140°C, the specific gravity rapidly increases during the first 24 hours of the heating as shown in FIG. 4, and still continues to increase thereafter, but with a very gradual curve. Accordingly, the crystallization of the polymer is considered to take place simultaneously with the heat-treatment even in such a fired shaped product as the pen core.

Figure 5:
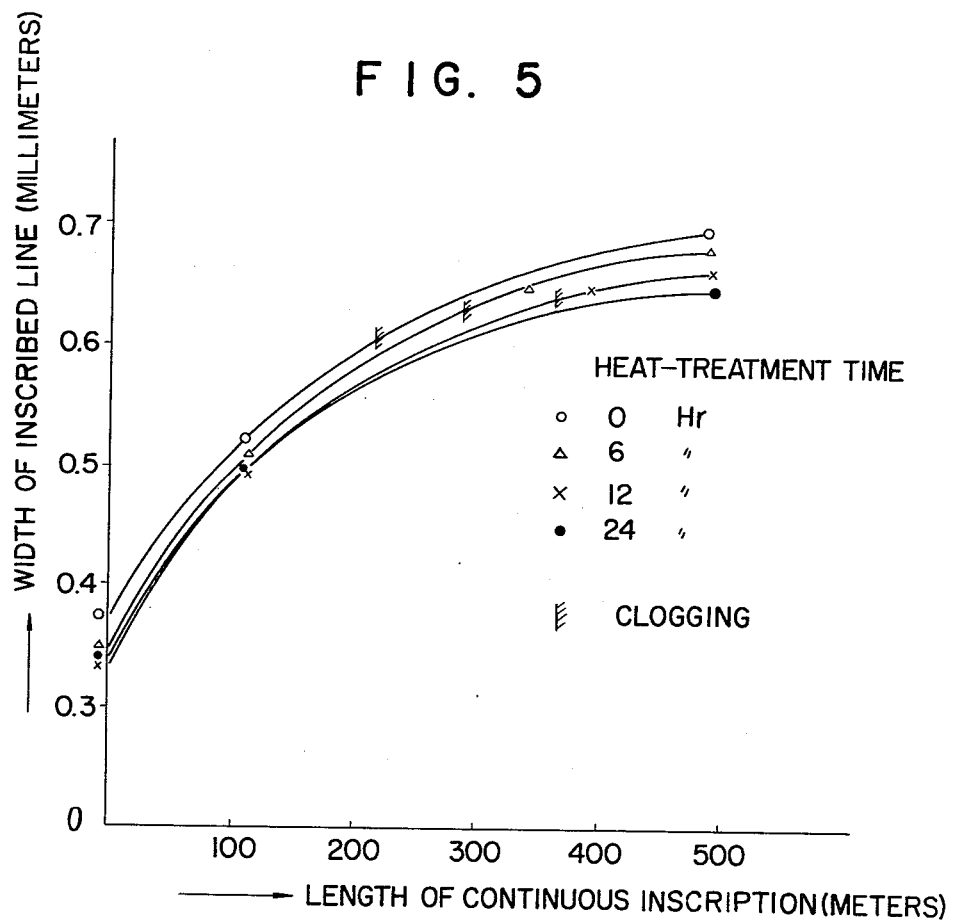
FIG. 5 is a graphical representation showing the relationship between the heat-treatment time and wear of the pen core.

The measured results of the tip wear as well as the time taken to commence grazing due to shortage in ink feeding caused by clogging of the core are shown in FIG. 5, from which it is noted that improvement therein depends upon heat-treatment time. A suitable heat-treatment time ranges from 70°C to the melting point of the polymer. It is more desirable that the heat-treatment be stopped at a temperature 10°C lower than the melting point of the polymer. The reason for this is that a temperature lower than this specific temperature range retards the rate of crystallization of the polymer, and, moreover, the crystallized polymer commences local melting at a temperature less than 10°C lower than the melting point of the polymer. Since the rate of crystallization of PVDF is in the vicinity of 140°C, a more preferable temperature range is from 120°C to 160°C.

The heating temperature and time for the preliminary heat-treatment of PVDF powder obtained by suspension polymerization, when necessary, is from the melting point of the polymer up to 300°C for the period of from 0.01 to 60 seconds in the case of PVDF having a small apparent specific gravity. The polymer material is charged into the metal mold and fired at a temperature range of from the melting point thereof to 350°C without applying pressure. The heat-treatment time after the shaped product is taken out of the metal mold depends on the heat-treatment temperature within the metal mold, and it usually requires at least 3 hours, or, more preferably 5 hours or longer. If less than 3 hours of heating is employed, no improvement can be gained. The longer the treatment time is, the more remarkable becomes the improvement. Since the shaped product is of a very small volume, there is no great difference in its manufacturing cost, even when the heat-treatment is conducted over a long period of time. However, when the heat-treatment is carried out at a temperature range of from 130° to 150°C, which temperature gives a relatively rapid rate of crystallization, the treatment is, in most cases, sufficient within 100 hours.

PREFERRED EMBODIMENTS OF THE INVENTION

The preferred examples of the present invention are as follows:

EXAMPLE 1

Polyvinylidene fluoride powder having an apparent specific gravity of 0.35, an inherent viscosity $\eta_{inh}$ of 1.92, and a particle size of from 10 to 100 microns was heat-treated beforehand in a fluidizing bed of 240°–250°C for 1 second to obtain a fired polymer of an apparent specific gravity of 0.75. This fired polymer was charged into a metal mold for producing a pen core at a charging ratio of about 70%. The charged material was heated at 300°C for about 30 minutes, after which the shaped products were cooled and taken out of the metal mold. The cores had a diameter of 2.0 mm, a length of 25 mm, and porosity of about 45%.

The pen cores thus-obtained were then placed in a furnace previously heated to 135°C, and were subjected to heat-treatment for 6, 12, and 24 hours, respectively. By using the sample cores which had been heat-treated for the abovementioned respective lengths of treatment time, and cores which had not been heat-treated, pencil-type felt pens were manufactured. The pens were made to contact the surface of paper would around a drum under a load of 140 gr. so as to inscribe continuously on the paper at a surface speed of rotation of the drum of 5.7 m/min. The length of continuous writing from commencement of inscription up to the time when grazing or scratching appears on the paper due to clogging of the core, as well as the variation in width of the inscribed line, were measured from the recorded paper, and shown in FIG. 5. The longer the heat-treatment is, the less the variation in the width of the inscribed lines. In more detail, with the pen of a non-treated core, the inscription began to graze after a lapse of about 220 minutes, while, with the pen of a core treated for 6 hours, grazing began after 300 minutes. Further, with the pen of a core treated for 24 hours, no grazing could be observed for 500 minutes.

EXAMPLE 2

Polyvinylidene fluoride powder having an apparent specific gravity of 0.78, an inherent viscosity of 2.10 and particle size of from 20 to 100 microns was heat-treated beforehand at a temperature of 145°–150°C for 24 hours. The heat-treated polymer was charged into a metal mold for producing a pen core in such a manner that the porosity of the shaped product is approximately 55%. The charged polymer material was the heated at 300°C for about 30 minutes, after which the shaped products were cooled and taken out of the metal molds. The pen cores had a diameter of 2.0 mm, a length of 25 mm, and porosity of about 41%. The shaped pen cores were subjected to the same test for continuous inscription on paper would around a drum as in Example 1, and the test results were the same as those of Example 1.

We claim:

1. A method for producing a porous ink-feeding writing instrument core from polyvinylidene fluoride spherical particles having an inherent viscosity of 1.0 to 4.0 when measured in 0.4g/100 cc solution of N,N′-dimethylformamide, a bulk density of 0.5–1.0 g/ml and a size range of 10–300 microns, comprising:
   a. placing said particles in a metal mold having the shape of a pen core;
   b. heating said particles in a pressure free state to a temperature between the melting point and 350°C, wherein said particles, due to their inherent viscosity, retain their general shape with interstices therebetween;
   c. cooling said molten particles to solidify same into the shape of said pen core;
   d. removing said pen core from said mold;
   e. placing the pen core in a furnace;
   f. heating said pen core in the furnace at a temperature between the melting point and 70°C for more than 3 hours; and
   g. cooling said pen core to produce therein a porosity of 30–50%.

2. The method according to claim 1, wherein the polyvinylidene fluoride particles are obtained by preheating a polyvinylidene fluoride powder having a bulk density of below 0.5 g/ml at a temperature range of 200°C to 300°C in a fluidized bed to heat-shrink the polyvinylidene fluoride powder, prior to the first heat treatment in the metal mold.

* * * * *